(12) United States Patent
Higgins

(10) Patent No.: US 6,909,717 B1
(45) Date of Patent: Jun. 21, 2005

(54) REAL TIME ETHERNET PROTOCOL (76) Inventor: Peter Higgins, 18 Greenway Cir., Sandwich, MA (US) 02563

(*) Notice: Subject to any disclaimer, the term of this patent is extended or adjusted under 35 U.S.C. 154(b) by 0 days.

(21) Appl. No.: 09/176,565

(22) Filed: Oct. 21, 1998

(51) Int. Cl.$^7$ .......................... H04L 12/28; H04L 12/56
(52) U.S. Cl. ...................... 370/394; 370/400; 370/471
(58) Field of Search ................................ 370/431, 445, 370/447, 448, 433, 437, 443, 444, 458, 461, 462, 400–405, 471, 394, 401, 469, 352, 489, 356

(56) References Cited

U.S. PATENT DOCUMENTS

| | | | |
|---|---|---|---|
| 5,852,723 A | * 12/1998 | Kalkunte et al. | 370/448 |
| 5,982,779 A | * 11/1999 | Krishnakumar et al. | 370/447 |
| 6,215,797 B1 | * 4/2001 | Fellman et al. | 370/503 |
| 6,272,147 B1 | * 8/2001 | Spratt et al. | 370/447 |

OTHER PUBLICATIONS

Tanenbaum, Andrew S., "Computer Networks," Copyright 1996 by Prentice Hall PTR, pp. 276–288, 3rd ed.
Chitra Venkatramani et al.: "Design, Implementation, and Evaluation of a Software–based Real–Time Ethernet Protocol" Computer Commuications Review, US Association for Computing Machinery. New York, vol. 25, No. 4 Oct. 1, 1995, pp. 27–37, XP000541648.

Shimokawa Y et al.: "Real–Time Ethernet for Industrial Applications" Proceedings of the International Conference on Industrial Electronics, Control and Instrumentation. (IECON), US, New York, IEEE, vol.–, 1983, pp. 829–834 XP002053973, pp. 830, column 2, line 28–p. 831, column 2, line 31.

* cited by examiner

Primary Examiner—Ajit Patel (57) ABSTRACT

The real time Ethernet protocol (RTEP) of the present invention offers improved speed and performance for an Ethernet network, while simultaneously enhancing the Ethernet's communication functionality. The RTEP provides a data frame, within the standard Ethernet protocol frame, containing information to support network functionality ordinarily associated with higher level protocol layers. The RTEP can guarantee delivery of messages as well as correct message sequence. The RTEP also supports IP subnetting, message piggybacking, Ethernet network sharing, and dynamic replacement of Ethernet stations. The present invention has particular application in conducting communications between one or more hosts and a telecommunications switching system.

32 Claims, 7 Drawing Sheets

REAL TIME ETHERNET PROTOCOL

BACKGROUND OF THE INVENTION

Distributed telecommunications switching systems are used to interconnect telecommunications resources and ports. The continued emergence of new telecommunications applications and resources, coupled with more users of those resources, has driven growing demand for bandwidth and versatility in the telecommunications switching fabric. One response to this growing demand is the exemplary, expandable, non-blocking, programmable telecommunications switching system described in U.S. Pat. No. 5,544,163, incorporated herein by reference.

The typical programmable telecommunications switching system has a number of nodal switches all operating under the control of a central host that runs application software to control switching functions and to control resources connected to each node. Thus, aside from the communication channels through the system, a programmable telecommunications system (or a portion thereof) must be additionally interconnected by a separate control network. By interconnecting the nodes with a local area network (LAN), application software and control information for the integrated switching system can be distributed from a central host or shared by a number of hosts.

The Institute of Electrical and Electronics Engineers (IEEE) has produced several standards for local area networks (LANs). These standards are collectively known as IEEE 802, and include the IEEE 802.3 standard for a Carrier Sense Multiple Access/Collision Detect (CSMA/CD) protocol commonly known as Ethernet. Ethernet has three basic elements: a physical medium connecting stations, an interface at each station for transceiving data across this "Ethernet channel" according to specific rules, and an Ethernet frame that consists of a standardized data format. An Ethernet system has no central controller. Each station must share the physical medium (Multiple Access) by contending with other stations for frame transmission opportunities, which it does by listening for openings on the physical medium (Carrier Sense) and, after starting each transmission, determining whether it is transmitting simultaneously with another station (Collision Deteoct). These functions are performed by a medium access control (MAC), which operates as the interface between an Ethernet station and the physical medium.

The Ethernet protocol just described offers a number of advantages in local area networking. The physical medium is simple, frequently consisting of nothing more than a twisted pair of copper wires. The rules of CSMA/CD are simple and well known and the hardware interface is inexpensive. An Ethernet network can support high data rates, with typical Ethernet networks operating at 10base-T (10 Mbps) or 100base-T (100 Mbps), and newer Ethernet networks transmitting data at rates above one billion bits per second. Further, because the Ethernet architecture is vendor-neutral or "open," Ethernet interfaces are widely available and many types of Ethernet stations can share the same physical medium, regardless of the hardware, operating system, and application software being used by each station. For these reasons, the Ethernet protocol has been widely adopted for LAN implementations.

Notwithstanding the popularity of Ethernet, it has several limitations that render it ineffective for real time networking applications such as a distributed telecommunications switching environment. For example, Ethernet does not guarantee delivery of messages, nor does it guarantee the correct message sequence for multi-frame data sequences. Where this type of functionality is desired, a transport protocol such as the transport control protocol (TCP) may be added. Even with such an additional protocol, Ethernet is non-deterministic in the sense that delivery of any data frame cannot be guaranteed within a specific amount of time. This limitation greatly restricts the utility of Ethernet in real time environments.

Further, Ethernet's multicast functions do not support logical station grouping to create individual subnetworks, or virtual networks, within an extended Ethernet network. Where this type of functionality is desired, a network protocol such as the internet protocol (IP) is needed. These higher level protocols also use their own addressing schemes to identify individual Ethernet stations, and an additional address resolution protocol (ARP) is used to support IP's point-to-point communications through the Ethernet's MAC addresses.

The combination of protocols results in a protocol stack, a hierarchy of protocols ranging from a physical layer where a bit stream is transmitted over a physical medium, to an application layer, where application software may use network data at a particular station. The protocol stack enhances communications by providing improved functionality such as connection-oriented messaging and "piggy-backing" of multiple small messages into a single data packet. Through the abstraction of the protocol stack, applications running on one station can communicate directly with applications on another station without any awareness of the intervening network and physical connections.

Protocol stacks may be satisfactory from an application programmer's point of view, but they come at a cost to system designers. Each protocol must be managed separately, which adds complexity. Each protocol also adds a processing step to network communications. For example, with the protocols described above, an application must pass network data to the TCP layer, which breaks the data up into packets and adds a header to each packet. These packets are then passed to the IP layer, which subdivides the TCP packets and adds additional header information including an IP address. The ARP layer then translates the IP addresses into MAC addresses for Ethernet communication, after which the IP packets are encapsulated in Ethernet frames for physical transmission. At a receiving station, this process is reversed, and data packets climb the protocol stack to reach a form amenable to the receiving application. All of these steps add time to the networking task. Where high-level network functionality such as routing is not required, the added processing time comes without any benefits.

Accordingly, there is a continuing need for a single network protocol that combines the speed and simplicity of Ethernet with selected functionality of higher level protocols, specifically the implementation of those higher level functions which may be used to enhance the performance of an Ethernet network. More specifically, there is a need for a single network protocol capable of meeting the real time node-to-node communications demands of a distributed, programmable telecommunications switching system. It is also desirable to have a protocol that is compatible with the physical infrastructure of existing Ethernet networks, and to share the physical infrastructure with other Ethernet users and protocols.

SUMMARY OF THE INVENTION

In brief summary, the present invention provides a real time Ethernet protocol that offers improved speed and performance in an Ethernet network, while simultaneously enhancing the Ethernet's communication functionality. The invention may be used to conduct communication between one or more hosts and a telecommunications switching system.

The real time Ethernet protocol (RTEP) of the present invention guarantees delivery of messages as well as correct message sequence. In a preferred embodiment, this is achieved by inserting, in the user data area of a standard Ethernet frame, a protocol byte field which may include a request for acknowledgment of receipt of the frame, and which may also include send/receive sequence numbers for correct reassembly at the destination.

The RTEP also supports IP subnetting. This is achieved by inserting, in the user data area of a standard Ethernet frame, a sender's IP address field which includes a network ID that can be used (with a subnet mask) to identify the logical network to which the sender belongs.

The RTEP also provides a high-speed Ethernet network by incorporating a number of features to improve network efficiency. The above-mentioned IP subnetting permits Ethernet stations to ignore data frames transmitted over a shared physical medium but generated on a separate logical network. Further, the processing time for individual frames is reduced by removing a number of layers from the protocol stack. The RTEP also supports piggybacking of several short messages within the standard Ethernet frame, which can reduce network traffic. This is accomplished by inserting, in the user data area of a standard Ethernet frame, an overall message length field and individual message length fields to indicate location, within the frame, of each piggybacked message.

The RTEP permits the dynamic addition and removal of Ethernet stations consistent with an expandable telecommunications switching system's architecture.

The RTEP can also coexist with other Ethernet protocols in sharing an Ethernet network. This is achieved by inserting into the type/length field of a standard Ethernet frame a specified value that identifies the frame as a real time Ethernet frame.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1A:
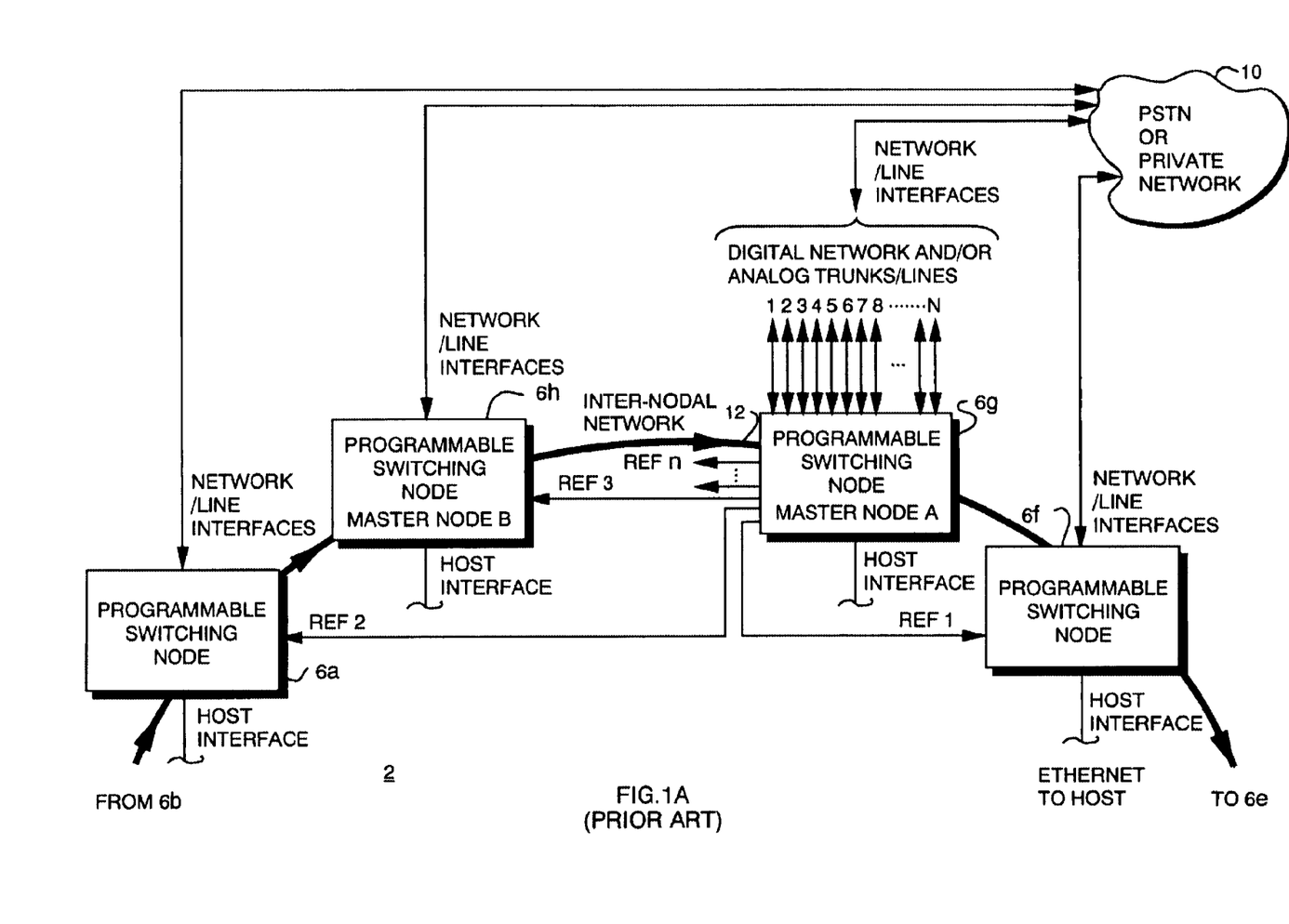
FIG. 1 is a block diagram of an expandable, distributed telecommunications switching system.
Figure 1B:
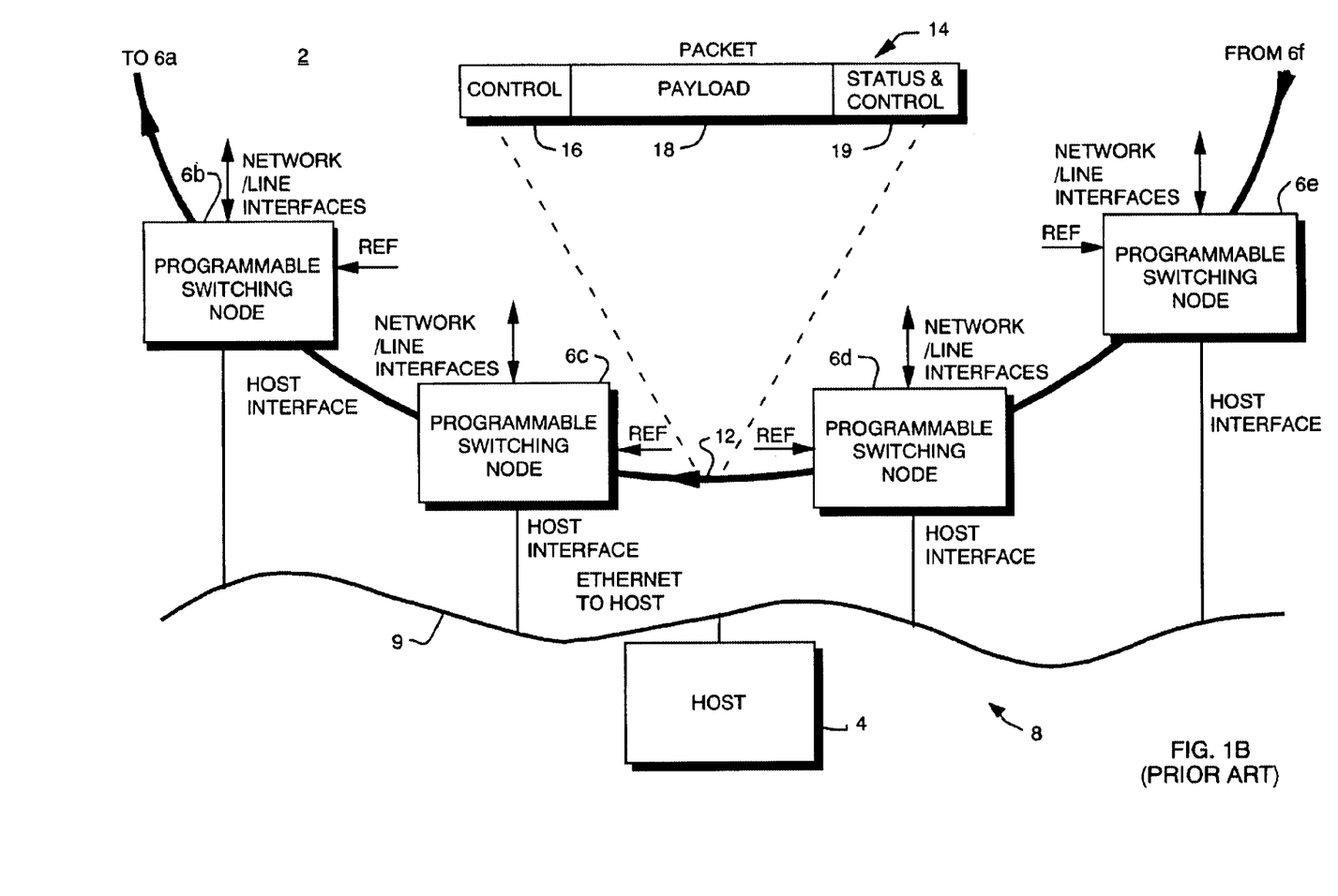

FIG. 1 shows an exemplary expandable, fully programmable telecommunications switching system 2. The switching system 2 includes a host 4 and a series of programmable switching nodes 6a–6h. Each of the nodes 6a–6h includes a host interface which is connected with one or more hosts 4 by an Ethernet local area network 8 over a physical medium 9. For purposes of improved clarity in this drawing, the host interfaces of the nodes 6a and 6f–6h are truncated.

Each of the nodes 6a–6h typically includes digital network/line interfaces for connection with the public switched telephone network (PSTN) or a private network 10. The term "private network" is intended in a broad sense to refer to any network or line or other interface other than the PSTN. Again, for enhanced clarity, the network/line interfaces of the nodes 6b–6e are truncated. As shown by representative node 6g, the network/line interface may terminate either digital networks or analog trunks/lines, or combinations of both types. The network/line interfaces of a given node may include suitable interfaces for performing communications using ATM, Signaling System 7 (SS7), ISDN, T1/robbed bit, E1/GAS, or other communication protocols. Node 6g is nominally designated "master node A" (active master node) and node 6h is nominally designated "master node B" (standby master node for redundancy). A synchronization reference line (ref 1 . . . ref n) extends from active master node 6g to each other switching node, although some such lines are truncated for clarity.

The nodes 6a–6h are preferably connected together by an inter-nodal network 12 which provides for high-speed, high-bandwidth digital communications among the nodes. As illustrated, the inter-nodal network 12 may be implemented using a fiber optic ring which enables each of the nodes 6a–6h to exchange packetized information with each other node served by the inter-nodal network 12. The inter-nodal network 12 may also be implemented with any of a variety of other types of communications networks, including, for example, Ethernet or other types of LANs, wireless communications networks, the PSTN (ATM/SONET), or the Internet. Using the PSTN or the Internet for the inter-nodal network 12 permits the nodes to be geographically distributed over large areas.

A general packet structure 14 for exchanging information over the inter-nodal network 12 consists of a control portion 16, a payload portion 18, and a status and control portion 19. The payload portion 18 contains the raw data being switched between ports by the switching system 2.

Using the inter-nodal network 12, a port of any given node may be connected to any other port of the same node or any other node in a fully non-blocking manner. In the embodiment shown in FIG. 1, with a total of eight switching nodes 6a–6h interconnected by the inter-nodal network 12, the switching system 2 is capable of switching (8×2,048=) 16,384 ports, which equates to 8,192 simultaneous, two-way calls.

It should be understood that each of the nodes 6a–6h operates independently with respect to the network/line interfaces terminated thereon. That is, any node may be removed from or added to the inter-nodal network 12 without impairing the operations or network/line interfaces of the other nodes. Further, the switching capacity of each switching node may be established independently from the switching capacities of other nodes (i.e., "small" switches may be combined with "large" switches on the same inter-nodal network 12). Thus the overall switching capacity of the switching system 2 may be increased simply by adding switching nodes to the inter-nodal network 12, subject to certain limitations regarding the data transmission rates of the inter-nodal network 12.

A telecommunications switching system including the above components is described in U.S. Pat. No. 5,544,163, referenced above. It should be appreciated that a number of variations to the basic switching system are possible. For example, the inter-nodal network 12 may consist of two or more fiber optic rings for either redundancy, expanded capacity, or both. Each node may include network/line interfaces, voice processing resources, multi-function digital signal processing resources, enhanced services resources, or any combination of these. Resources may more particularly include telecommunications services such as tone detection and generation, conferencing, voice recorded announcements, call progress analysis, speech recognition, ADPCM compression, and other media processing or enhanced services. Each node may also include redundant switches, processing resources, and line/network interfaces. It should also be appreciated that the host 4 need not be connected directly through the physical medium 9 to every node 6. It is possible to connect the host 4 to only some, or even one, of the nodes 6, and to have control information forwarded to the remaining nodes using the inter-nodal network 12 described above.

It is particularly contemplated that the present invention will be practiced in connection with a programmable switching system such as that described above. However, the present invention may be usefully practiced in connection with any system which uses an Ethernet network. Unless otherwise specified, the term Ethernet as used herein refers to any CSMA/CD protocol including the IEEE 802.3 standard (1–10 Mbps on various media), commercially available Ethernet, high-speed protocols such as Fast Ethernet and Gigabit Ethernet, and wireless Ethernet.

Figure 2:
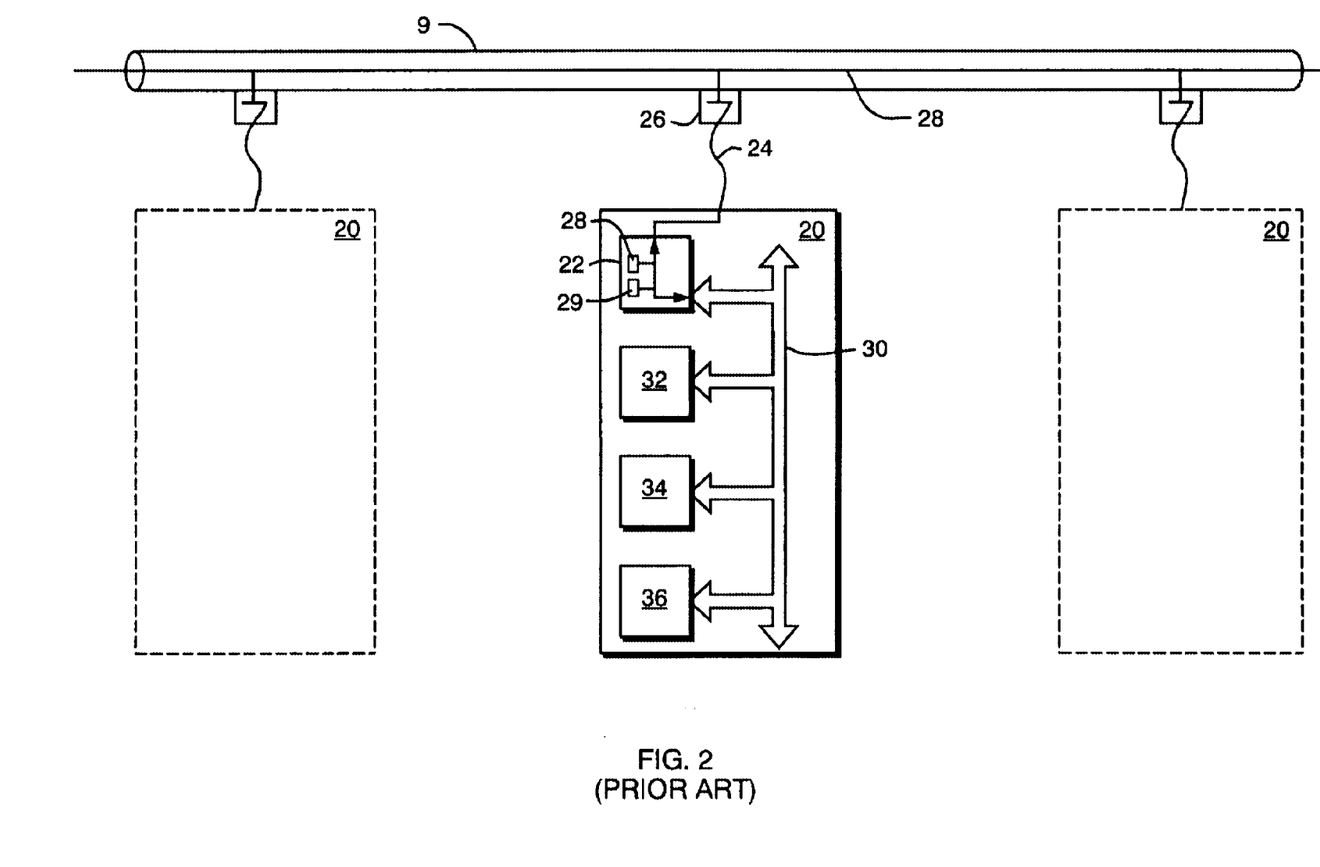
FIG. 2 is a schematic diagram of a prior art Ethernet station and interface.

A typical Ethernet connection to the physical medium 9 is shown in FIG. 2. Each Ethernet station 20 includes an Ethernet interface 22 which is typically an interface board. The Ethernet station 20 may be a host 4 of the switching system 2, a node 6 of the switching system 2, or any other computer or processing device connected to the physical medium 9 in order to communicate using the Ethernet network 8. This includes personal computers, workstations, and peripherals such as bulk storage devices and printers. The Ethernet interface 22 may connect to the Ethernet station 20 using any means known in the art, including buses such as ISA, EISA, PCI, PCMCIA, or USB. The Ethernet interface 22 receives an Ethernet network signal containing network data from a transceiver cable 24 connected to the physical medium 9 by a transceiver 26. The transceiver typically includes a direct tap to a core 28 of the physical medium 9 where the physical medium 9 is a "thick Ethernet" cable, or an industry standard BNC connector T-junction where the physical medium 9 is a "thin Ethernet" cable.

The transceiver cable 24 terminates at the Ethernet interface 22 inside the Ethernet station 20. The Ethernet interface 22 includes a controller chip 28 for manipulating data into and out of the Ethernet frame format, and for transceiving Ethernet frames over the physical medium 9 in the form of an Ethernet network signal. The controller chip 28 computes checksums on outgoing frames and verifies them on incoming frames. The controller chip 28 can further manage DMA transfers, input/output buffers, and other aspects of network management. The Ethernet interface 22 can also include an interface memory 29 for buffering data.

Once data has been processed by the Ethernet interface 22, it can be placed on the Ethernet station bus 30 to be used locally by a CPU 32, a memory 34, an Ethernet station I/O 36, or any other device or computer-readable medium as might be conventionally attached to a computer data bus, particularly those devices used in a switching system 2 such as a nodal switch or media processing resources. Where the Ethernet station 20 is a node 6 in the switching system 2, the Ethernet station bus 30 will include a nodal control bus for controlling the switching and data processing functions of the node 6.

As is known in the art, the CPU 32 of the Ethernet station 20 operates under the control of an operating system. The operating system for each node 6 responds to one or more application programs for controlling the functions of the node 6 as well as the switching system 2 as a whole.

Figure 3:
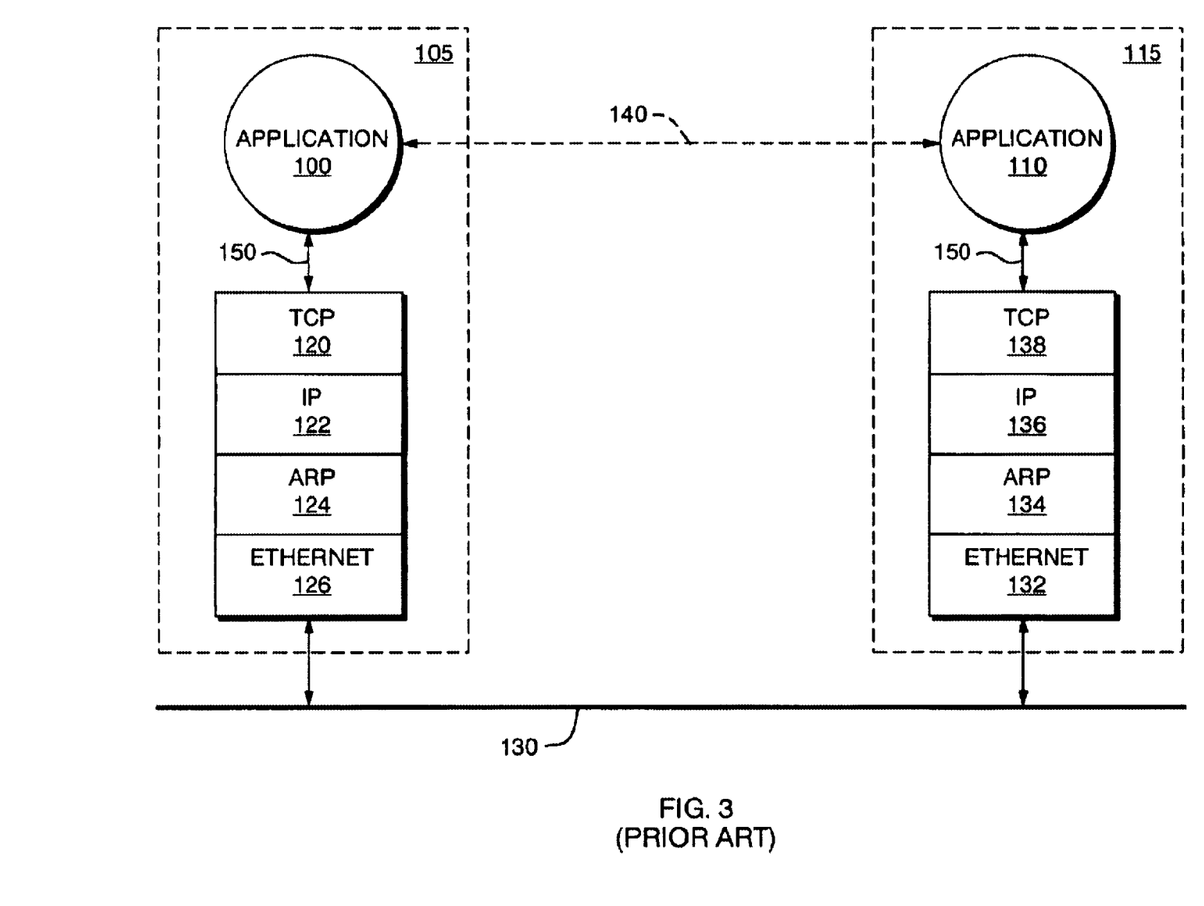
FIG. 3 is a block diagram of an Ethernet network including a prior art protocol stack.

FIG. 3 shows a typical prior art protocol stack based on the well known TCP/IP standard. Each protocol provides a standardized interface to the layer above it and the layer beneath it. Using this architecture, a sending application 100 on a sending station 105 can seamlessly transmit data to a receiving application 110 on a receiving station 115. The sending application 100 passes user data to the TCP layer 120, along with instructions to transmit the data to the receiving application 110, usually in the form of network service "primitives" drawn from the group of instructions available at the interface. At the interface, the TCP layer 120 includes primitives for managing connection-oriented sessions with prioritization and acknowledgment of receipt. The TCP layer 120 packages the data into packets and passes these packets to the IP layer 122 using a different set of primitives appropriate to that interface. The data is broken into smaller packets, after which it descends through the ARP layer 124 and the Ethernet layer 126, eventually arriving on the physical medium 130 that forms an Ethernet network.

On the receiving end, this process is reversed and the stream of bits present on the physical medium 130 is converted by the receiving station 115 into computer-readable form, where an initial determination is made whether each data frame is intended for the receiving station 115. If the Ethernet address is correct, then the data climbs the protocol stack from the Ethernet layer 132 to the ARP layer 134 to the IP layer 136 to the TCP layer 138, finally reaching the receiving application 110. This process is bidirectional and the roles of the sending station 105 and the receiving station 115 can be reversed. The result is a virtual two way link 140 directly between the sending application 100 and the receiving application 110.

The individual layers of the protocol stack are typically implemented using a programming language, such as C, that will run on the operating systems of the sending station 105 and the receiving station. The virtual two way link 140 is available as functional calls 150 to the protocol interface at the top of each protocol stack. This virtual two way link 140 does not require either application to be aware of the intervening physical structure of the network. Other arrangements within this basic conceptual framework are also well known, such as the Open Systems Interconnection Reference Model.

Figure 4:
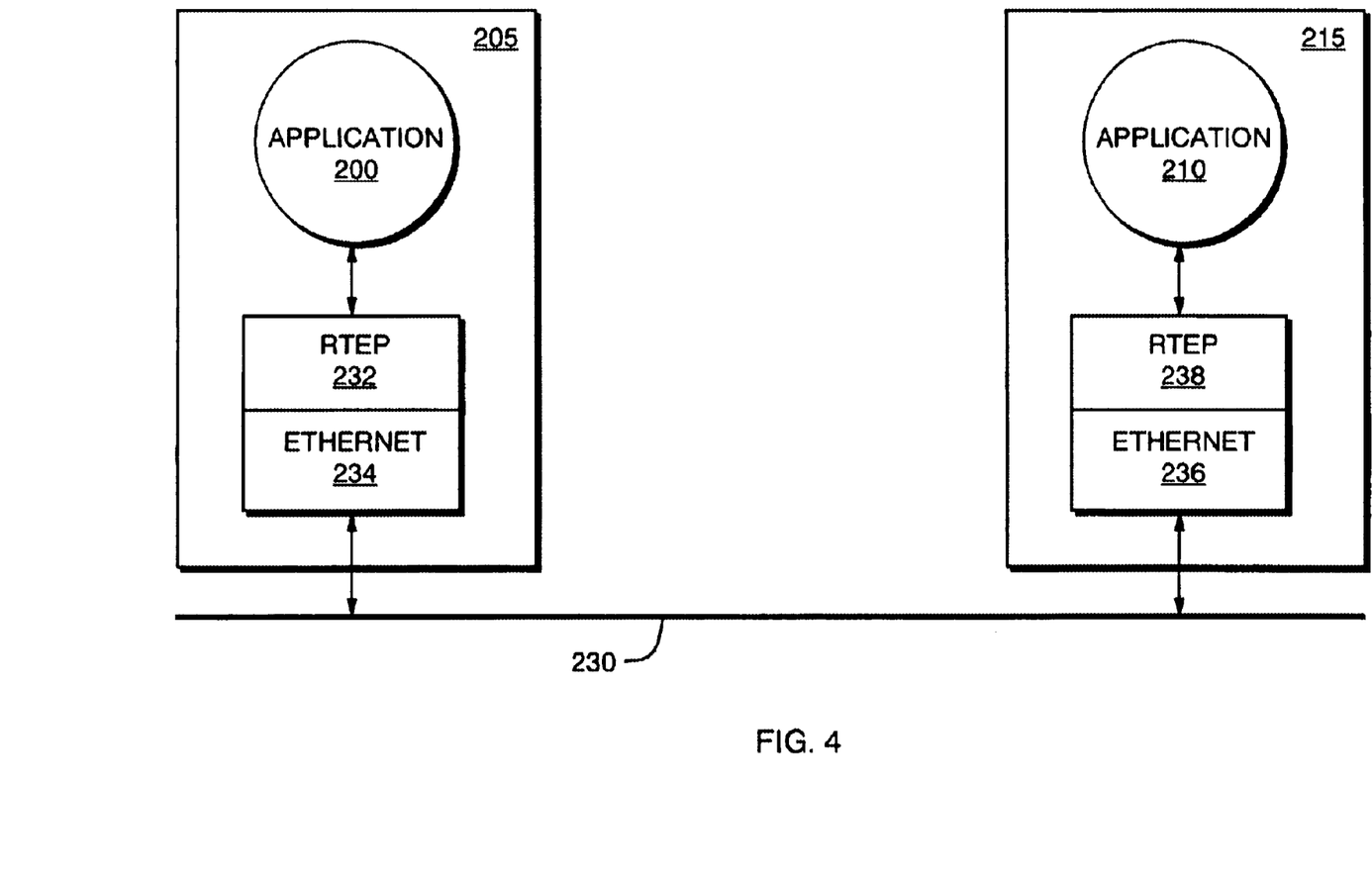
FIG. 4 is a block diagram of an Ethernet network including the real time Ethernet protocol stack.

Several salient features of these protocol stacks in general, and the Ethernet to TCP/IP stack in particular, should be pointed out in reference to the present invention. The first is that they all provide a common interface at the top layer to application software so that different applications can seamlessly share a network. This aspect of the protocol stack is mirrored by the present invention which provides a fixed application interface on one hand and a fixed, Ethernet interface on the other hand. The second feature is that individual layers of the protocol stack provide very sophisticated network functions such as routing, provision of a name server, error correction, and packet prioritization. Much of this functionality is not applicable to an Ethernet network composed of a single physical medium. By contrast, some of the higher level functionality, such as piggybacking of short messages, can be advantageously exploited within an Ethernet network. The present invention incorporates those aspects of the conventional protocol stack that can be exploited to enhance performance in an Ethernet network. The resulting protocol is illustrated in FIG. 4, which shows two applications sharing data across and Ethernet network using the RTEP. As in the prior art, a sending application 200 running on a sending station 205 transmits data to a receiving application 210 running on a receiving station 215 using the Ethernet physical medium 230. However, the sending application 200 only passes data through two protocols, the RTEP 232 and the Ethernet protocol 234. At the receiving station 215, the data likewise only passes through an Ethernet protocol 236 and a RTEP 238 before reaching the receiving application 210. This process is bidirectional.

As with prior art network protocols, the RTEP layers 232, 238 perform functions transparent to the applications 200, 210. The RTEP layer 232 on the sending side can buffer small data segments and piggyback them with other small data segments. The RTEP layer 232 can also break long data segments into individual segments which are buffered and sequenced for sequential transmission. The RTEP layer 232 provides address resolution so that receiving applications 210 can be reached without using Ethernet/MAC addresses. The RTEP layer 232 independently, i.e., without any involvement from the application 200, tracks acknowledgment of individual frames and retransmits frames that do not receive an acknowledgment. All of these functions are bidirectional, and the complement to each function is performed by a receiving RTEP layer 238. These network functions are well known and commonly used with other network protocols. They will typically be implemented in a programming language suitable to the operating system residing on a particular Ethernet station.

The interface between an application 200, 210 and the RTEP layer 232, 238 is presented to the application as a collection of network service primitives. These primitives consist of a set of calls available to the application. A preferred embodiment of the RTEP includes six primitives implemented in the C programming language. These primitives are: (1) send_to_node, which accepts as arguments a user defined node address and a pointer to data for connection-oriented transmission, (2) send_to_address, which accepts as arguments an Ethernet (MAC) address and a pointer to data for connection-oriented transmission, (3) broadcast_to_nodes, which accepts as an argument a pointer to data for broadcast to all nodes, (4) send_unack_to_node, which accepts as arguments a user defined node address and a pointer to data for unacknowledged transmission, (5) send_unack_to_address, which accepts as arguments an Ethernet (MAC) address and a pointer to data for unacknowledged transmission, and (6) initialize_com, which initializes an Ethernet station when it is added to the network. Various implementations of these primitives are known in the art.

Figure 5:
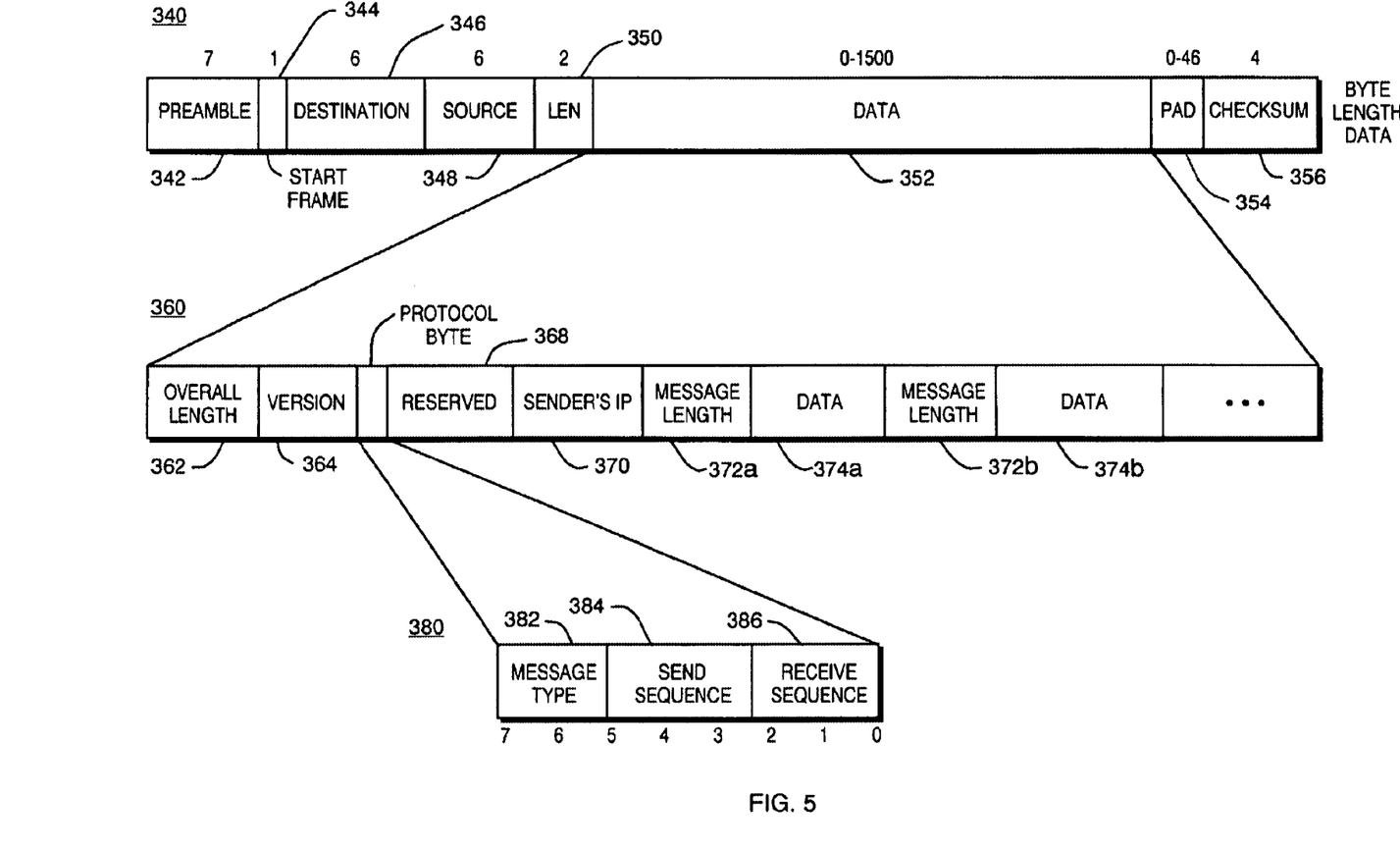
FIG. 5 shows the data structure of a real time Ethernet protocol frame constructed according to the present invention.

Refer next to FIG. 5, which shows an Ethernet frame 340, according to the IEEE 802.3 protocol. The Ethernet frame 340 starts with a preamble 342 consisting of 7 bytes, each with the bit pattern 10101010. The encoded preamble is a square wave which allows synchronization of send and receive clocks. The preamble 342 is followed by a start of frame field 344 containing the byte 10101011.

The next field of the Ethernet frame 340 is a destination address 346 containing a 6 byte address that identifies the destination station, the intended recipient of the frame. If the highest order bit of the destination address 346 is a 1, then the destination address 346 is a group address and the Ethernet frame 340 will be multicast to a group of Ethernet stations specified by the group address. If the destination address is all 1's, then the Ethernet frame 340 will be broadcast to all Ethernet stations connected to the physical medium 9. The destination address 346 is followed by a field containing the source address 348, a 6 byte identifier of the sending Ethernet station.

Following the synchronization and addressing information, the Ethernet frame 340 provides a length of data field 350 that specifies the length of the following data field 352. According to the 802.3 protocol, any data field 352 shorter than 46 bytes will be padded with a pad field 354 so that the length of the entire Ethernet frame 340 is never shorter than 64 bytes. The final field of the Ethernet frame 340 is a checksum 356.

The length of data field 350 is also referred to as a type/length field 350 because it can be used to identify specific variants, or types, of the Ethernet protocol. These types, represented by specific bit patterns, are registered with Xerox Corporation to insure uniqueness. In this manner, various Ethernet protocols can share the same physical medium 9 without generating conflicts. The RTEP of the present invention is registered with Xerox Corporation and has a specified type value of 0x8833–0x883C. A value from this range is placed in the type/length field 350 of each Ethernet frame intended for use within the RTEP network. Packets that do not include the correct type identifier for a particular Ethernet station 20 application are dropped by that application. In addition to avoiding protocol conflicts, this increases network efficiency by avoiding unnecessary processing of frames.

This standard Ethernet flame 340 provides the basic information for transmitting and receiving data across a physical medium 9. The present invention is implemented within this standard Ethernet frame 340 to provide enhanced network functionality such as connection-oriented messaging, sequencing of long messages in a connectionless communication, piggybacking of messages to conserve network usage, retransmission of lost messages for guaranteed delivery of data, and rejection of out of sequence messages (as required for connection-oriented messaging). Of course, other functionality is also possible within this protocol, provided it needs only the information of the standard Ethernet frame 340 and an RTEP frame 360.

The RTEP frame 360 resides within the standard Ethernet frame 340, and consists of several individual fields. In operation, the RTEP places each outbound RTEP frame 360 in an Ethernet frame 340 for transmission over the physical medium. Each station in the RTEP network similarly receives an Ethernet frame 340 using its own Ethernet interface 22, and removes the RTEP frame 360 which the protocol then uses locally to implement higher level communications functionality.

The first field of the RTEP frame 360 is a two byte long overall length field 362. This field specifies the length of the RTEP frame 360 within the standard Ethernet frame 340.

The next field of the RTEP frame 360 is a one byte long version field 364. This field specifies a particular version of RTEP used to create the RTEP frame 360, which permits orderly enhancements to RTEP should additional functionality be desired. If the version number does not match the RTEP version on a receiving Ethernet station, then the frame is typically dropped, although it is also possible to provide for simultaneous handling of different versions of RTEP by each station.

The next field of the RTEP frame 360 is the one byte long protocol byte 380. The protocol byte 380 is further divided into three separate fields. The two most significant bits specify a message type 382, which may be (1) unacknowledged, (2) information, (3) acknowledged, and (4) reject. The next three significant bits of the protocol byte 380 specify a send sequence number 384. The three least significant bits specify a receive sequence number 386.

The combination of message types and sequence numbers, along with address information contained in the standard Ethernet frame 340, can be used to enable various communication methods as are known in the art, such as connection-oriented messaging (where a connection must be established prior to exchanging any data) and connectionless messaging. Connectionless messaging may further be unicast (to a single station 20), multicast (to a number of stations 20 in a pre-defined group), or broadcast (to every station 20 connected to the Ethernet network 8). A broad range of enhanced network functionality is enabled by the information contained in the protocol byte 380, including sequencing of messages, rejection of out of sequence messages, and acknowledgment of received messages.

The next field of the RTEP frame 360 is a one byte reserved field 368 that is reserved for future use. This provides expandability for the protocol should greater functionality be desired in future versions.

The next field of the RTEP frame 360 is a four byte sender's IP address field 370 containing the IP address of the sending Ethernet station 20. This permits IP subnetting through the use of a conventional IP subnet mask. In this manner, the Ethernet network 8 can be divided into logical subnetworks for purposes such as broadcasting.

The next field of the RTEP frame is a two byte message length field 372a indicating the message length of the following data field 374a. The data field 374a contains the application data being transferred between stations of the Ethernet network 8. The data field 374a may be followed by one or more additional length fields 372b and data fields 374b so that several individual data segments can be piggybacked in a single Ethernet frame 340.

The following is an example of a network function using the standard Ethernet frame 340 and the RTEP frame 360 of the present invention. The RTEP frame 360 may be used to initialize new stations on the physical medium 9, as when a station is added to the Ethernet network 8 or re-initialized. To accomplish this, an initialize_com call is made to the RTEP. The RTEP then generates an RTEP frame 360. The version field 364 is set to the currently operating version of the RTEP; the message type 382 of the protocol byte 380 is set to "unacknowledged." The send sequence number 384 and the receive sequence number 386 are set to zero. The reserved field 368 is set to zero. The sender's IP address field 368 is set to the four byte IP address of the station being initialized. No information is inserted in the message length fields 372 and the data fields 374. Finally, the overall length of the RTEP frame 360 is determined and this value is inserted into the overall length field 362 of the RTEP frame 360. This assembled RTEP frame 360 is inserted into an Ethernet frame 340 (including the RTEP type specifier) and broadcast over the Ethernet network 8 using well known Ethernet methods.

The RTEP frame 360 is removed from the Ethernet frame 340 at each Ethernet station receiving the broadcast message. Upon receipt of the initialization RTEP frame 360, each Ethernet station 20 will, at the RTEP level, add the new station to its list and set the send and receive sequence numbers for the new station to zero. The Ethernet address of the new station is obtained from the Ethernet frame 340 and the IP address of the new station is obtained from the RTEP frame 360. Each receiving station will also assemble a new RTEP frame 360 in response to the initialization RTEP frame 360, with the message type field set to "information" and the sender's IP address field set to the ac-. knowledging station's four byte IP address. The RTEP inserts an assembled information RTEP frame 360 into an Ethernet frame 340 and sends this frame to the new station using well known Ethernet methods.

In response to the new station's broadcast, the new station will receive an information Ethernet frame 340 from each station 20 already on the Ethernet network 8. The new station uses these frames to generate a list of existing stations, along with each station's IP address and Ethernet address. Further, the send and receive sequence numbers for each existing station are initialized to zero. At this point the new station has been fully initialized and further network functions may be performed.

Numerous methods for implementing network functions such as the one described above are well known in the art. The above example is only one such embodiment using the information in the standard Ethernet frame 340 and the RTEP frame 360. It is in no way intended to limit the scope of the invention or the types of network functions which may be implemented using the invention.

As should be clear from the preceding discussion, the information in the combined Ethernet frame 340 and RTEP frame 360 can be used to provide functionality typically associated with higher level protocols without the additional processing and data handling required to implement a traditional protocol stack. The RTEP is implemented as a collection of routines, preferably in the C programming language, which function as a single protocol layer between the Ethernet interface 22 and one or more higher software layers present on each Ethernet station 20. Thus the RTEP transfers data between Ethernet stations 20 more quickly than the collection of protocols in a more conventional protocol stack. This conservation of resources is illustrated in FIGS. 3 and 4, which show applications communicating over a network using a prior art protocol stack and the RTEP.

As previously explained with reference to FIG. 5, the type/length field 350 can specify different Ethernet protocols so that multiple protocols can share the same physical medium 9. This approach also allows a single Ethernet station to support different applications communicating over the network using different protocols. This would typically arise in a telecommunications system where a host application is controlled remotely using a conventional Ethernet network. The host must also maintain communication with individual nodes of the telecommunications system, which will preferably be accomplished using the improved RTEP.

Figure 6:
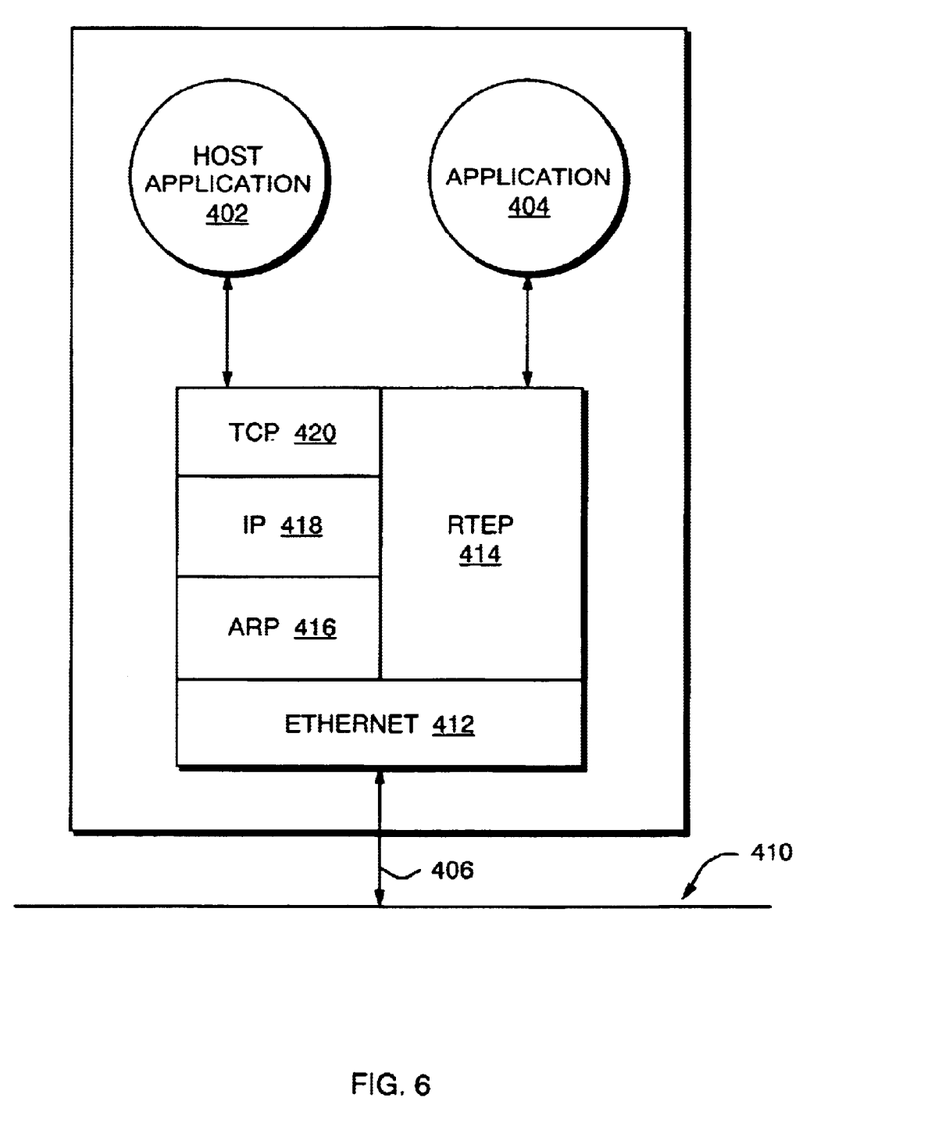
FIG. 6 is a block diagram of an Ethernet station sharing multiple protocol stacks including a real time Ethernet protocol stack.

FIG. 6 shows an Ethernet station 300 that is sharing two protocols. A host application 402 and a control application 404 are running on the Ethernet station 300. A conventional Ethernet interface 406 operates as a transceiver for the physical medium 410, and the Ethernet protocol 412 serves to place data into, and remove data from, Ethernet frames 340. However, two different protocol stacks reside on the application side of the Ethernet protocol 412. If an Ethernet frame 340 carries an RTEP identifier in the type/length field 350, then the RTEP frame 360 is removed and passed to the RTEP protocol 414, which in turn processes the RTEP frame 360 and passes any data therein to the application 404. Conversely, if the Ethernet frame 340 does not carry an RTEP identifier, then the data 352 (which is itself a TCP/IP packet) is passed to the ARP protocol 416, the IP protocol 418, and the TCP protocol 420 for processing. As should be clear, applications sending data from the Ethernet station 300 must either use different calls to access the two protocol stacks or explicitly employ different libraries for communication functions.

The foregoing description has been limited to specific embodiments of the invention. It will be apparent, however, that variations and modifications may be made to the invention, with the attainment of some or all of the advantages of the invention. Therefore, it is an object of the appended claims to cover all such variations and modifications as come within the true spirit and scope of the invention.

What is claimed is:

1. A system for providing network signaling in a network including at least two nodes connected in communicating relationship, the system comprising:
    A. means for providing a data signal for communications between nodes in said network, said data signal including an Ethernet frame including a length/type field and data field;
    B. a type identifier in the length/type field that identifies the Ethernet frame as containing a real time Ethernet protocol frame; and
    C. the real time Ethernet protocol frame within the data field, further comprising:
        i. an overall message length field of two bytes;
        ii. a version field of one byte;
        iii. a protocol byte;
        iv. a reserved field of one byte;
        v. a sender's IP address field of four bytes; and
        vi. one or more fields of user data, each field of user data being preceded by a respective individual message length field of two bytes.

2. The system of claim 1 wherein the data signal is a 10 Mbps Ethernet signal.

3. The system of claim 1 wherein the data signal is a 100 Mbps Ethernet signal.

4. The system of claim 1 wherein the data signal is a Fast Ethernet signal.

5. The system of claim 1 wherein the data signal is a wireless Ethernet signal.

6. A system for providing communications in a network including at least two nodes connected in communicating relationship, the system comprising:
    A. a real time Ethernet protocol provided via a data frame embodied in a computer-readable medium, the data frame including an Ethernet frame including a length/type field and data field;
    B. a type identifier in the length/type field that identifies the Ethernet frame as containing a real time Ethernet protocol frame; and
    C. the real time Ethernet protocol frame within the data field, further comprising:
        i. an overall message length field of two bytes;
        ii. a version field of one byte;
        iii. a protocol byte;
        iv. a reserved field of one byte;
        v. a sender's IP address field of four bytes; and
        vi. one or more fields of user data, each field of user data being preceded by a respective individual message length field of two bytes.

7. The system of claim 6 wherein the computer-readable medium is a memory of a personal computer.

8. The system of claim 6 wherein the computer-readable medium is a memory of a workstation.

9. The system of claim 6 wherein the computer-readable medium is a memory of a telecommunications system host.

10. The system of claim 6 wherein the computer-readable medium is a memory of a programmable telecommunications switch.

11. A data frame for use in a telecommunications system, the telecommunications system comprising a plurality of nodes, one or more hosts, and an Ethernet network connecting the plurality of nodes and the one or more hosts in a communicating relationship, and the data frame comprising:
    A. an Ethernet frame including a length/type field and data field;
    B. a type identifier in the length/type field that identifies the Ethernet frame as containing a real time Ethernet protocol frame; and
    C. the real time Ethernet protocol frame within the data field, further comprising:
        i. an overall message length field of two bytes;
        ii. a version field of one byte;
        iii. a protocol byte;
        iv. a reserved field of one byte;
        v. a sender's IP address field of four bytes; and
        vi. one or more fields of user data, each field of user data being preceded by a respective individual message length field of two bytes.

12. A method for establishing communication among a first plurality of Ethernet stations, each Ethernet station being a node or a host of a telecommunications system, the telecommunications system being arranged in an Ethernet network for exchanging control information, wherein the method comprises the steps of:
    A. transmitting an Ethernet frame from a first Ethernet station of the first plurality of Ethernet stations, the Ethernet frame containing a real time Ethernet protocol frame;
    B. receiving the Ethernet frame at a second Ethernet station of the first plurality of Ethernet stations;
    C. extracting the real time Ethernet protocol frame from the Ethernet frame;
    D. processing the real time Ethernet protocol frame, thereby providing data from the first Ethernet station to the second Ethernet station;
    E. determining an IP address of the first Ethernet station; and
    F. subnet masking the IP address at the second Ethernet station.

13. The method of claim 12 wherein the step of processing the real time Ethernet protocol frame further comprises the step of removing a plurality of piggybacked messages from the real time Ethernet protocol frame.

14. A method for establishing communication among a first plurality of Ethernet stations, each Ethernet station being a node or a host of a telecommunications systems, the telecommunications systems being arranged in an Ethernet network for exchanging control information, wherein the method comprises the steps of:
    A. transmitting an Ethernet frame from a first Ethernet station of the first plurality of Ethernet stations, the Ethernet frame containing a real time Ethernet protocol frame;
    B. receiving the Ethernet frame at a second Ethernet station of the first plurality of Ethernet stations;
    C. extracting the real time Ethernet protocol frame from the Ethernet frame;

D. processing the real time Ethernet protocol frame, thereby providing data from the first Ethernet station to the second Ethernet station;

E. determining an IP address of the first Ethernet station; and

F. subnet masking the IP address at the second Ethernet station.

15. The method of claim 14 wherein the step of processing the real time Ethernet protocol frame further comprises the steps of determining the sequence number of the real time Ethernet protocol frame and rejecting the real time Ethernet protocol frame when the sequence number is out of sequence.

16. The method of claim 12 wherein the step of transmitting the real time Ethernet protocol frame further comprises the step of inserting a request for acknowledgment into the real time Ethernet protocol frame, and wherein the step of processing the real time Ethernet protocol frame further comprises the steps of acknowledging the receipt of the real time Ethernet protocol frame by transmitting a second Ethernet frame containing a real time Ethernet protocol acknowledgment from the second Ethernet station to the first Ethernet station.

17. The method of claim 16 wherein the step of transmitting the real time Ethernet protocol frame further comprises the step of retransmitting the real time Ethernet protocol frame when no acknowledgment is received by the first Ethernet station.

18. The method of claim 12 wherein the step of transmitting the real time Ethernet protocol frame further comprises the step of broadcasting the real time Ethernet protocol frame to every one of the first plurality of Ethernet stations.

19. The method of claim 12 further comprising the step of sharing a physical medium with a second plurality of Ethernet stations, wherein the second plurality of Ethernet stations uses a protocol other than the Ethernet protocol.

20. A means for establishing communication among a first plurality of Ethernet stations, each Ethernet station being a node or a host of a telecommunications system, the telecommunications system being arranged in an Ethernet network for exchanging control information, wherein the means comprises:

A. means for transmitting an Ethernet frame from a first Ethernet station of the first plurality of Ethernet stations, the Ethernet frame containing a real time Ethernet protocol frame;

B. means for receiving the Ethernet frame at a second Ethernet station of the first plurality of Ethernet stations;

C. means for extracting the real time Ethernet protocol frame from the Ethernet frame; and D. means for processing the real time Ethernet protocol frame and wherein said transmitting means, said receiving means, said extracting means, and said processing means cooperate to establish a connection-oriented message session between two or more of the first plurality of Ethernet stations, and further cooperate to transmit a plurality of connection-oriented messages in sequence, each message having a unique sequence number, and further cooperate to provide retransmission of lost messages.

21. The communication means of claim 20, wherein the transmitting means, the receiving means, the extracting means, and the processing means further cooperate to reject out of sequence messages.

22. The communication means of claim 20 wherein the transmitting means, the receiving means, the extracting means, and the processing means further cooperate to acknowledge received messages.

23. The communication means of claim 20, wherein the transmitting means, the receiving means, the extracting means, and the processing means further cooperate to piggyback a plurality of messages in the real time Ethernet protocol frame.

24. The communication means of claim 20 wherein the transmitting means, the receiving means, the extracting means, and the processing means further cooperate to subnet one or more messages with IP addresses.

25. The communication means of claim 20 further comprising a means for sharing a physical medium with a second plurality of Ethernet stations, wherein the second plurality of Ethernet stations uses an Ethernet protocol other than the real time Ethernet protocol.

26. A method of providing Ethernet network communications in real time between stations connected in a network by a physical medium, and employing Ethernet protocol frames in a transmission regime, the method including the steps of:

inserting into the Ethernet protocol frame:

(A) a real time Ethernet protocol subframe that includes:

a protocol field including a message type and sequence number such that the information in the combined original Ethernet frame and the real time subframe is used to provide the transfer of application data between stations including connection-oriented messaging for which a connection must be established prior to exchanging any data, and a version field included in said real time Ethernet protocol subframe to indicate which version of a real time Ethernet protocol is being employed; and (B) a length field specifying the length of the real time Ethernet protocol subframe.

27. A method of providing Ethernet network communications in real time between stations connected in a network by a physical medium, and employing Ethernet protocol frames in a transmission regime, the method including the steps of:

(A) inserting into the Ethernet protocol frame, a real time Ethernet protocol subframe that includes:

a protocol field including a message type and sequence number such that the information in the combined original Ethernet frame and the real time subframe is used to provide the transfer of application data between stations including connection-oriented messaging for which a connection must be established prior to exchanging any data; and (B) sending information in said protocol byte to accomplish at least one of:

(i) sequencing of messages;

(ii) rejection of out of sequence messages; and (iii) acknowledgement of received messages.

28. The method as defined in claim 27 including the further step of:

providing a data field in the real time Ethernet protocol subframe containing application data being transferred between stations in the network.

29. The method as defined in claim 27 including the further step of:

initializing new stations on the physical medium by using said real time Ethernet protocol subframe to broadcast to every station connected to the network.

30. The method as defined in claim 27 including the further step of:

providing a reserved field to accommodate expansion and modification of said real time Ethernet protocol.

31. The method as defined in claim 27 including the further step of:

dividing said protocol field into subfields including a message type field that includes at least one of:
(i) an acknowledge/unacknowledge type message;
(ii) an information type message;
(iii) a rejection message;
(iv) a send sequence number; and
(v) a receive sequence number.

32. The method as defined in claim 27 including the further steps of:

constructing a real time protocol subframe within an Ethernet protocol frame in order to initialize a new station on the network, including:

(i) setting the send message type of the protocol byte to "unacknowledged";
(ii) setting the send sequence number and the receive sequence number to zero;
(iii) setting the reserved field to zero;
(iv) using an IP address of a station to be initialized as the IP address field;
(v) determining the value of the overall length of the real time Ethernet protocol subframe;
(vi) inserting this information into the overall length field;
(vii) inserting a disassembled real time Ethernet protocol subframe into an Ethernet frame; and
(viii) broadcasting over the Ethernet network whereby a new station is initialized on the Ethernet network.

* * * * *